Curry Comb

116268
PATENTED JUN 27 1871

Witnesses
Charles H. Yerxa
W. L. Bennem

Inventor
Jules Chaumont
by his atty
E. S. Renwick

UNITED STATES PATENT OFFICE.

JULES CHAUMONT, OF WOODHAVEN, NEW YORK, ASSIGNOR TO LALANCE & GROSJEAN MANUFACTURING COMPANY, OF NEW YORK CITY.

IMPROVEMENT IN CURRY-COMBS.

Specification forming part of Letters Patent No. 116,268, dated June 27, 1871.

*To all whom it may concern:*

Be it known that I, JULES CHAUMONT, of Woodhaven, in the county of Queens and State of New York, have made an invention of a new and useful Improvement in the Construction of Curry-Combs; and that the following is a full, clear, and exact description and specification of the same.

The object of the invention is to enable an efficient curry-comb to be manufactured at a low cost. To this end the invention consists of the combination of a series of strips of sheet metal toothed at an edge by means of cross-bars forming a frame, and by rivets passing through said strips and cross-bars, so that said toothed strips are connected with each other, and are also connected with the handle of the implement, by means of said cross-bars and rivets.

In order that the invention may be fully understood I have represented in the accompanying drawing and will proceed to describe a curry-comb, embodying it in the best form at present known to me.

Figure 1:
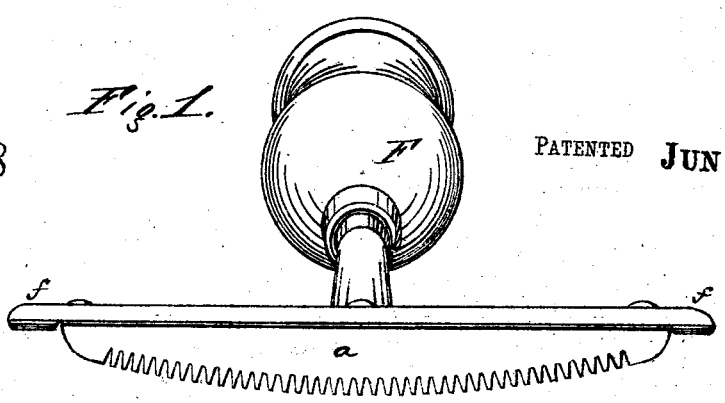
Figure 3:
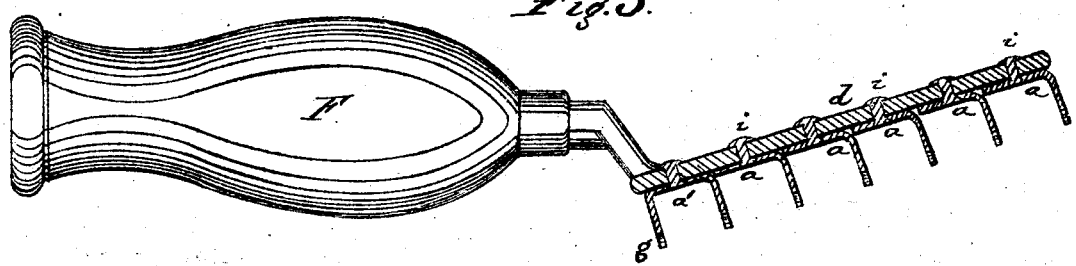
Figure 2:
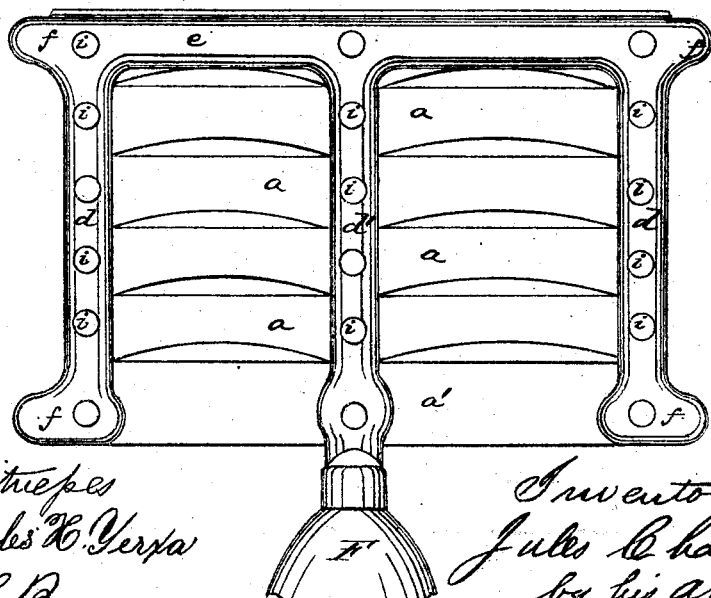

Figure 1 represents a head view of said curry-comb. Fig. 2 represents a view of the back of the same, and Fig. 3 represents a section of the same through one of the side bars of the frame.

The curry-comb is composed of a series of narrow strips of sheet metal, $a\ a\ a'$, bent into the form of an angle-iron, and toothed at one edge in the usual manner; so as to form a species of comb. These strips are riveted to a malleable-iron frame, B, composed of three cross-bars, $d\ d\ d'$, connected by a head-bar, $e$, and the central cross-bar $d'$ is extended and bent so as to form a tang, which is driven into the wooden handle F in the usual manner. The strip of sheet metal $a'$ nearest the handle is bent to a U-section, so as to present a terminal row of teeth, $g$, near the handle. It will be perceived, by reference to the drawing, that the strips $a\ a\ a'$ are connected with each other by means of the cross-bars $d\ d\ d'$ through the intervention of the rivets $i\ i$, each rivet passing through a single strip and a cross-bar, and that, consequently, the strips need be of no greater breadth than is requisite to form the comb of teeth and the bearings for the rivet-heads; hence the sheet metal required for the manufacture of the implement is very small in quantity, and, being in small pieces, can be made out of the scraps obtained in the manufacture of larger articles. I prefer to scallop out the edges of the strips which lie next the cross-bars so as to form openings $m\ m$. I also prefer to construct the frame with projections $f\ f$ at the corners to act as bumpers when the implement is struck against a fixed object for the purpose of detaching dirt from it. In the curry-comb represented in the accompanying drawing the three cross-bars are united by the head-bar. This construction, although not essential to the invention, is expedient, because the entire frame can be cast and handled in one piece.

I am aware that curry-combs have been made of strips of sheet metal riveted to a sheet-metal back, and also of similar strips riveted together by rivets passing through adjacent overlapping strips. I am also aware that curry-combs have been made of strips of sheet metal bent into a U-form, comb-toothed at both edges, and riveted to cross-pieces connecting them with each other and with the handle. I therefore do not claim, broadly, the construction of curry-combs of strips of sheet metal; but

What I claim as my invention, and desire to secure by Letters Patent, is—

The combination of the strips of metal toothed at an edge only, the cross-bars, and the rivets passing through single strips and the cross-bars, substantially as before set forth.

In testimony whereof I have hereto set my hand this 24th day of October, A. D. 1870.

JULES CHAUMONT. [L. S.]

Witnesses:
E. W. MARTIN,
WM. C. CLIFFORD.